(12) United States Patent
Bassov et al.

(10) Patent No.: US 11,514,001 B2
(45) Date of Patent: Nov. 29, 2022

(54) CONCURRENT COMPUTATIONS OPERATING ON SAME DATA FOR CPU CACHE EFFICIENCY

(71) Applicant: EMC IP Holding Company LLC, Hopkinton, MA (US)

(72) Inventors: Ivan Bassov, Brookline, MA (US); Philippe Armangau, Acton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 185 days.

(21) Appl. No.: 15/955,287

(22) Filed: Apr. 17, 2018

(65) Prior Publication Data

US 2019/0318016 A1 Oct. 17, 2019

(51) Int. Cl.
*G06F 16/178* (2019.01)
*G06F 16/174* (2019.01)

(52) U.S. Cl.
CPC ........ *G06F 16/178* (2019.01); *G06F 16/1744* (2019.01)

(58) Field of Classification Search
CPC ............................ G06F 16/178; G06F 16/1744
See application file for complete search history.

(56) References Cited

U.S. PATENT DOCUMENTS

| 8,533,166 | B1 * | 9/2013 | Sulieman | H04L 67/06 375/240 |
| 2004/0111626 | A1 * | 6/2004 | Livny | G06F 21/71 713/189 |
| 2008/0313187 | A1 * | 12/2008 | Jewett | G06F 3/0626 |
| 2012/0151222 | A1 * | 6/2012 | Koifman | G06F 12/1408 713/189 |
| 2014/0244598 | A1 * | 8/2014 | Haustein | H04L 9/3239 707/692 |
| 2017/0046360 | A1 * | 2/2017 | Therrien | G06F 16/1748 |
| 2019/0026228 | A1 * | 1/2019 | Jiang | G06F 12/084 |

* cited by examiner

*Primary Examiner* — Apu M Mofiz
*Assistant Examiner* — Husam Turki Samara
(74) *Attorney, Agent, or Firm* — Muirhead and Saturnelli, LLC

(57) ABSTRACT

Techniques for CPU cache efficiency may include performing concurrent processing, such as for first and second data operations, in a synchronized manner that prevents loading the same data chunk into the CPU cache more than once. Processing may include synchronizing the first and second data operations with respect to a first data chunk to ensure that both the first and second data operation processing has completed prior to proceeding with performing such processing on a second data chunk. The first and second data operations may be any two of deduplication, encryption, and compression, performed inline as part of the data path. In one embodiment, the first and second data operations for the first data chunk may be performed in parallel or sequentially where neither data operation proceeds with another data chunk until processing of the first and second data operations is complete for the first data chunk.

10 Claims, 7 Drawing Sheets

CONCURRENT COMPUTATIONS OPERATING ON SAME DATA FOR CPU CACHE EFFICIENCY

BACKGROUND

Technical Field

This application generally relates to performing data computation operations.

Description of Related Art

Systems may include different resources used by one or more host processors. Resources and host processors in the system may be interconnected by one or more communication connections, such as network connections. These resources may include, for example, data storage devices such as those included in the data storage systems manufactured by Dell Inc. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may issue I/O operations, such as data read and write operations, received at a data storage system. Host systems may store and retrieve data by issuing the I/O operations to the data storage system containing a plurality of host interface units, disk drives (or more generally storage devices), and disk interface units. Such data storage systems are provided, for example, by Dell Inc. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of files, objects, logical units, logical devices or logical volumes. Thus, the I/O operations issued by the host may be directed to a particular storage entity, such as a file or logical device. The logical devices may or may not correspond to the actual physical drives. Allowing multiple host systems to access the single data storage system allows the host systems to share data stored therein.

SUMMARY OF THE INVENTION

In accordance with one aspect of the techniques herein is a method of performing data processing comprising: performing first processing for a first data processing operation on a first data chunk; performing second processing for a second data processing operation on the first data chunk; and synchronizing the first processing and the second processing with respect to the first data chunk, wherein said synchronizing ensures that both the first processing and the second processing have completed prior to proceeding with performing any of the first processing and the second processing on a second data chunk. The first processing and the second processing for the first data chunk may be performed in parallel. One of the first processing and the second processing may complete processing for the first data chunk prior to another one of the first processing and the second processing, and wherein the synchronizing may not allow the one of the first and second processing to proceed with processing the second data chunk until the another one of the first processing and the second processing has completed its processing for the first data chunk. The first processing may include digest computation processing and the first data processing operation may be data deduplication. The second processing may include performing any of compression and decompression. The first data processing operation and the second data processing operation may be performed inline as part of I/O path processing. Third processing for a third data processing operation performing on the first data chunk may be performed in parallel with the first processing and the second processing. The third data processing operation may include code that performs any of encryption and decryption. The first processing and the second processing for the first data chunk may be performed sequentially. The first processing may include digest computation processing and the first data processing operation may be data deduplication. The second processing may include performing any of compression and decompression. The first data processing operation and the second data processing operation may be performed inline as part of I/O path processing. Third processing for a third data processing operation using the first data chunk may be performed sequentially after completing the first processing and the second processing for the first data chunk. The third data processing operation may include code that performs any of encryption and decryption. The first data processing operation and the second data processing operation may be performed in a single thread of execution. Performing one of the first data processing operation and the second data processing operation may result in loading the first data chunk in a cache of a first processor that executes code to perform the first processing and the second processing, and wherein the first data chunk may remain in the cache of the first processor while at least performing the first data processing operation for the first data chunk and the second data processing for the first data chunk.

In accordance with another aspect of techniques herein is a system comprising: at least one processor; and a memory comprising code stored therein that, when executed, performs a method of data processing comprising: performing first processing for a first data processing operation on a first data chunk; performing second processing for a second data processing operation on the first data chunk; and synchronizing the first processing and the second processing with respect to the first data chunk, wherein said synchronizing ensures that both the first processing and the second processing have completed prior to proceeding with performing any of the first processing and the second processing on a second data chunk.

In accordance with another aspect of techniques herein is a computer readable medium comprising code stored thereon that, when executed, performs a method of data processing comprising: performing first processing for a first data processing operation on a first data chunk; performing second processing for a second data processing operation on the first data chunk; and synchronizing the first processing and the second processing with respect to the first data chunk, wherein said synchronizing ensures that both the first processing and the second processing have completed prior to proceeding with performing any of the first processing and the second processing on a second data chunk.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
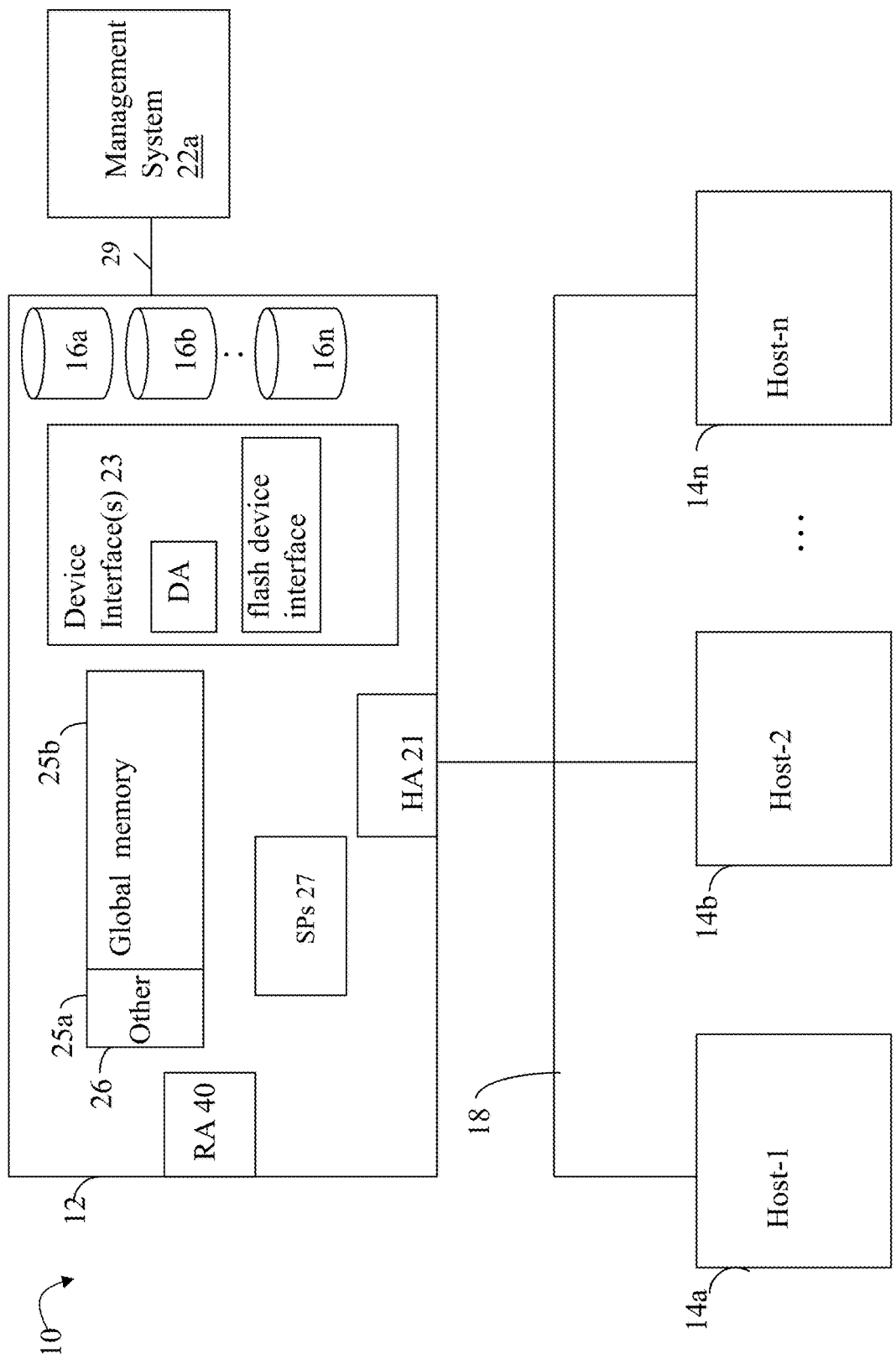
FIGS. 1 and 2B are examples of components that may be included in a system in accordance with techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as block-based protocols (e.g., SCSI, Fibre Channel, iSCSI), file system-based protocols (e.g., NFS), and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment may include data storage arrays or other components from one or more vendors. In subsequent examples illustrated the techniques herein, reference may be made to a single data storage array by a vendor, such as by Dell Inc. However, as will be appreciated by those skilled in the art, the techniques herein are applicable for use with other data storage arrays by other vendors and with other components than as described herein for purposes of example.

The data storage system 12 may be a data storage appliance or a data storage array including a plurality of data storage devices 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include one or more SLC (single level cell) devices and/or MLC (multi level cell) devices.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a system cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

It should be noted that although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Also shown in FIG. 1 is a management system 22a that may be used to manage and monitor the system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

It should be noted that each of the different adapters, such as HA 21, DA or disk interface, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system, such as the Dell EMC Unity® data storage system by Dell Inc., that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receiving a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to FIG. 1, the control commands may be issued from data storage management software executing on management system 22a to the data storage system 12. Such commands may be, for example, to establish or modify data services, provision storage, perform user account management, and the like. For example, commands may be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to FIG. 1, a data storage system may have a separate physical connection 29 from a management system 22a to the data storage system 12 being managed whereby control commands may be issued over such a physical connection 29. However, it may be that user I/O commands are never issued over such a physical connection 29 provided solely for purposes of connecting the management system to the data storage system. In any case, the data path and control path each define two separate logical flow paths.

An embodiment of a data storage system in accordance with techniques herein may perform different data processing operations or services on stored user data. For example, the data storage system may perform one or more data reduction operations, such as data deduplication and compression, as well as other types of operations or services, such as encryption. Such data reduction operations attempt to reduce the amount of storage needed for storing data on non-volatile backend storage devices with the goal of reducing the cost per unit of storage consumed (e.g., dollar cost per GB of storage). Generally, data deduplication, compression and encryption techniques are known in the art and any suitable such technique may be used in an embodiment in accordance with techniques herein. In at least one embodiment, the compression technique may be a lossless compression technique such as an algorithm from the Lempel Ziv algorithm family (e.g., LZ77, LZ78, LZW, LZR, and the like). In at least one embodiment in accordance with techniques herein, data deduplication processing performed may include digest or hash value computation using an algorithm such as based on the SHA-256 hashing algorithm known in the art. Data deduplication generally refers to removing redundant or duplicate data portions. Data deduplication techniques may include looking for duplicate data blocks or chunks whereby only a single instance of the data block or chunk is retained (stored on physical storage) and where pointers or references may be used in connection with duplicate or redundant copies (which reference or identify the single stored instance of the data block).

Figure 2A:
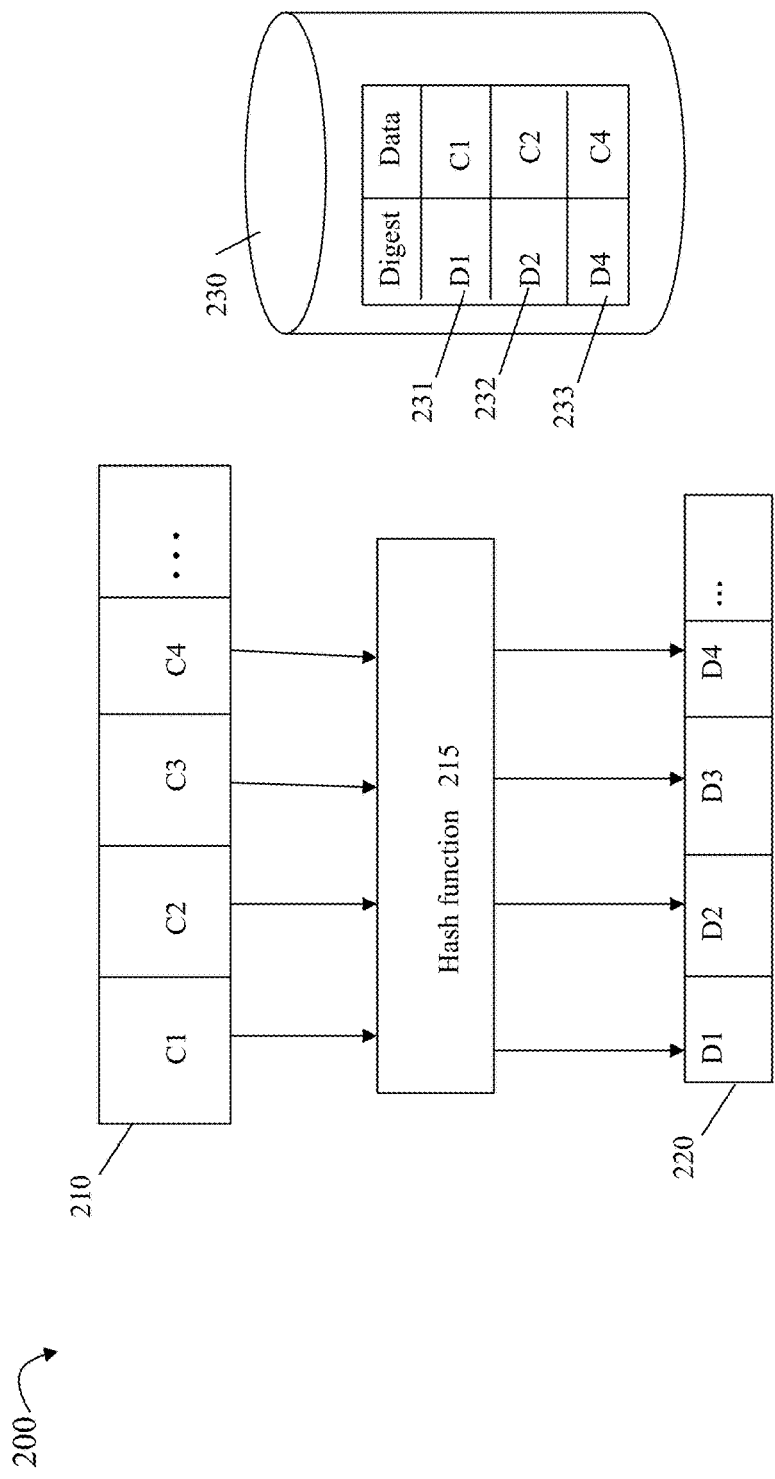
FIG. 2A is an example illustrating data deduplication as may be performed in an embodiment in accordance with techniques herein.

Referring to FIG. 2A, shown is an example 200 illustrating processing that may be performed in connection with data deduplication processing in an embodiment in accordance with techniques herein. Element 210 may denote the original data being written or stored on back-end non-volatile storage. The original data may be partitioned into multiple data blocks or chunks C1, C2, C3, C4 and the like. In at least one embodiment and for purposes of illustration, the data chunks may all be the same size where the size may vary with embodiment. As a variation depending on the data deduplication technique utilized, the chunks of 210 may be of varying or different sizes. Each chunk is provided as an input to hash function 215. As noted above, in at least one embodiment, the hash function 215 may be the SHA-256 hashing algorithm, or more generally, any suitable cryptographic hashing function known in the art. For each chunk of 210, the hash function 215 may perform processing and generate, as an output, a hash value or digest. Element 220 includes digests D1, D2, D3, D4, and the like, where a corresponding different one of the digests DN is generated for one of the chunks CN (where "N" is an integer denoting the chunk and associated digest generated for that chunk). For example, D1 is the digest generated for C1, D2 is the digest generated for C2, D3 is the digest generated for C3, and so on. Generally, a hash function 215 is selected which has an acceptably low probability of a "hash collision" of generating the same digest or hash value for two different chunks. The strength of the hash function 215 may be measured by the unlikelihood of a collision occurring two different input chunks of data produce the same digest. The strength increases with the bit length of the hash value or digest. Thus, if two chunks, such as C1 and C3, have the same digests whereby D1=D3, then chunks C1 and C3 match (e.g., are identical matching data chunks or blocks). If two chunks, such as C1 and C4, have different digests whereby D1 does not equal D4, then chunks C1 and C4 do not match (e.g., are different or non-matching data chunks or blocks). In cases where two matching or identical chunks have the same digest, only a single copy of the data chunk is stored on backend non-volatile physical storage of the data storage system. The single stored instance of the data chunk may be referenced using a pointer, handle, the digest of the chunk, and the like.

Element 230 of FIG. 2A may denote the data store used to store data chunks. In this example, as noted above, assume chunks C1 and C3 are the same with remaining chunks C2 and C4 being unique. The data store 230 may also be referred to as a single instance store (SIS). In at least one embodiment, element 230 may be organized and managed using a data structure, such as a hash table. In at least one embodiment, computed digests may be used as an index into the hash table where the single unique instances of data chunks may be stored (along with other metadata as may be needed for maintaining the table and also in accordance with the particular hash table management used in an embodiment). Hash tables are data structures known in the art. A hash table uses a hash function to compute an index into an array of buckets or slots, from which the desired data can be found. In this example, the chunk of data may be mapped by hash function 215, and thus by the chunk's digest, to a particular entry in the table at which the chunk data is stored. To further illustrate, the hash function 215 may be used to generate a digest for a particular data chunk. The digest is then further mapped (e.g., such as by another mathematical function, using particular portions of the digest, and the like) to a particular index or entry of the hash table. The particular mapping used to map the digest to a corresponding table entry varies, for example, with the digest and the size of hash table.

When storing a new data chunk, such as C1, its digest may be mapped to a particular hash table entry 231 whereby if the table entry is null/empty, or otherwise does not already include a data chunk matching C1, then C1 is stored in the table entry along with its associated digest D1 (this is the first time chunk C1 is recorded in the data store 230). Otherwise, if there is already an existing entry in the table including a data chunk matching C1, it indicates that the new data chunk is a duplicate of an existing chunk. In this example as noted above, processing is performed for C1, C2, and C4 respectively, where entries 231, 232, and 233 are added since there are no existing matching entries in the hash table. When processing chunk C3, as noted above, C3 has a digest D3 matching D1 whereby C3 (and thus D3) maps to entry 231 of the hash table already including a matching chunk C1 (so no additional data chunk is added to 230 for C3 since C3 is determined as a duplicate of C1). In connection with representing a particular file or other storage entity including multiple duplicate occurrences of a particular chunk such as C3, the single instance or copy of the data may be stored in 230. Additionally, a handle or reference, such as identifying the hash table entry 231, its digest, and the like, may be used to reference the single instance or copy of the data storage in 230. When reconstructing or restoring data such as the file to its original form, the handle or reference into the hash table for chunk C3 may be used to obtain the actual C3 chunk of data from 230.

Figure 2B:
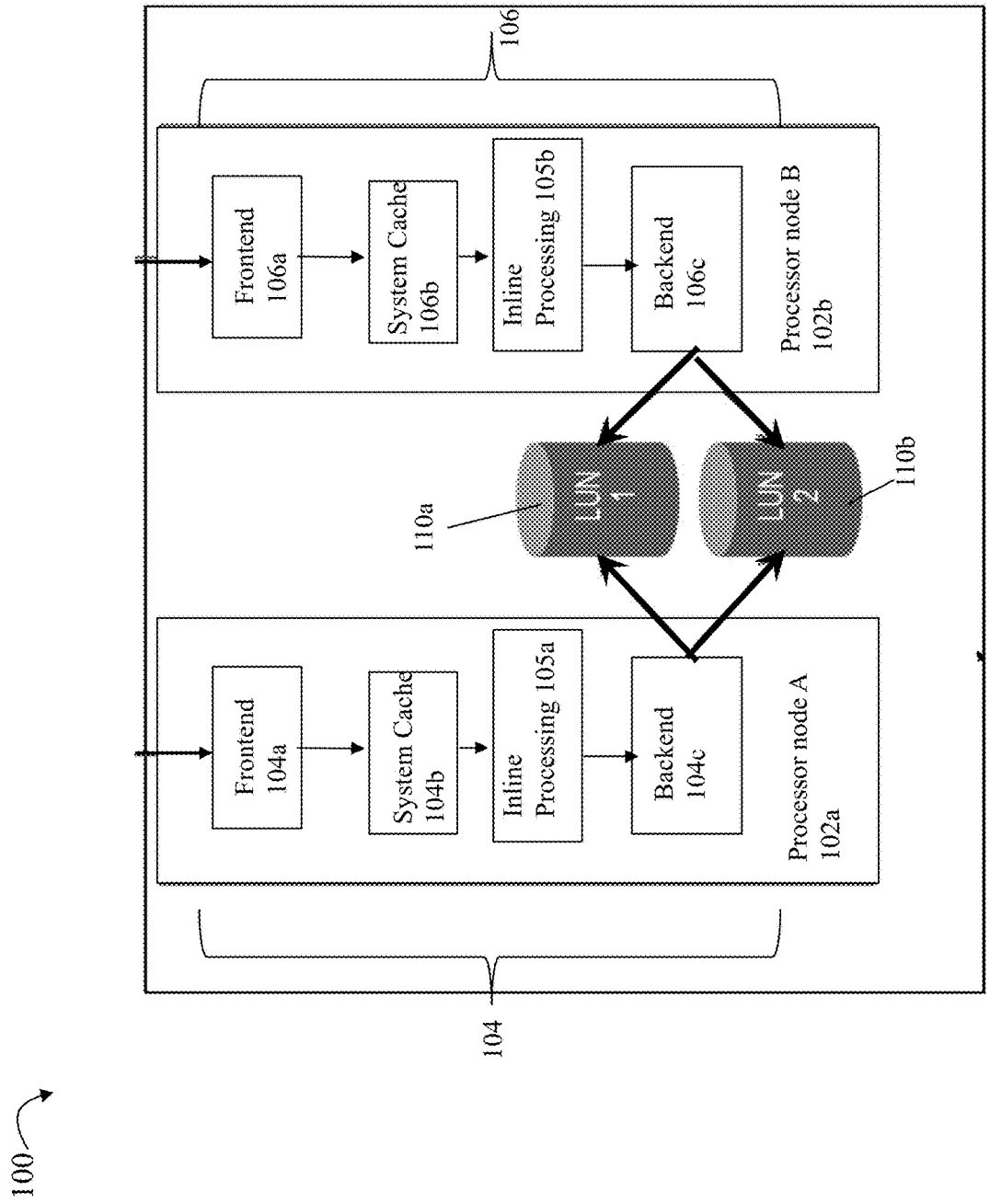

With reference to FIG. 2B, shown is an example 100 illustrating components that may be included in the data path in at least one existing data storage system in accordance with techniques herein. The example 100 includes two processor nodes A 102a and B 102b and associated software stacks 104, 106 of the data path where I/O requests may be received by either processor node 102a or 102b. In the example 200, the data path 104 of processor node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and permanent non-volatile storage (e.g., back end physical non-volatile storage devices accessed by BE components such as DAs as described herein). During movement of data in and out of the system cache layer 104b (e.g., such as in connection with read and writing data respectively, to physical storage 110a, 110b, inline processing may be performed by layer 105a. Such inline processing operations of 105a may be optionally performed and may include any one of more data processing operations in connection with data that is flushed from system cache layer 104b to back-end non-volatile physical storage 110a, 110b, as well as when retrieving data from back-end non-volatile physical storage 110a, 110b to be stored in system cache layer 104b. In at least one embodiment, the inline processing may include performing compression and data duplication. Although in following paragraphs reference may be made to inline processing including compression and data deduplication, more generally, the inline processing may include performing at least two data processing operations which may include any of compression and data deduplication, as well as any other suitable data processing operation, such as encryption.

In a manner similar to that as described for data path 104, the data path 106 for processor node B 102b has its own FE component 106a, system cache layer 106b, inline processing layer 105b, and BE component 106c that are respectively similar to components 104a, 104b, 105a and 104c. Elements 110a, 110b denote physical storage provisioned for LUNs whereby an I/O may be directed to a location or logical address to read data from, or write data to, the logical address. The LUNs 110a, 110b are examples of storage objects representing logical storage entities included in an existing data storage system configuration. Since, in this example, writes directed to LUNs 110a, 110b may be received for processing by either of the nodes 102a and 102b, the example 100 illustrates what may also be referred to as an active-active configuration.

In connection with a write operation as may be received from a host and processed by processor node A 102a, the write data may be written to the system cache 104b, marked as write pending (WP) denoting it needs to be written to physical storage 110a, 110b and, at a later point in time, the write data may be destaged or flushed from the system cache to the physical storage 110a, 110b by the BE component 104c. The write request may be considered complete once the write data has been stored in the system cache whereby an acknowledgement regarding the completion may be returned the host (e.g., by component 104a). At various points in time, WP data stored in the system cache is flushed or written out to physical storage 110a, 110b. In connection with inline processing layer 105a, prior to storing the original data on physical storage 110a, 110b, compression and data deduplication processing may be performed that converts the original data (as stored in the system cache prior to inline processing) to a resulting form (that may include compressed and/or deduplicated portions) which is then written to physical storage 110a, 110b. In at least one embodiment, when deduplication processing determines that a portion (such as a block or chunk) of the original data is a duplicate of an existing data portion already stored on 110a, 110b, that particular portion of the original data is not stored in a compressed form and may rather be stored in its deduplicated form (e.g., there is no need for compression of a chunk determined to be duplicate of another existing chunk).

In connection with a read operation to read a block or chunk of data, a determination is made as to whether the requested read data block is stored in its original form (in system cache 104b or on physical storage 110a, 110b), or whether the requested read data block was previously deduplicated or compressed. If the requested read data block (which is stored in its original decompressed, non-deduplicated form) is in system cache, the read data block is retrieved from the system cache 104b and returned to the host. Otherwise, if the requested read data block is not in system cache 104b but is stored on physical storage 110a, 110b in its original form, the requested data block is read by the BE component 104c from the backend storage 110a, 110b, stored in the system cache and then returned to the host.

If the requested read data block was previously deduplicated, the read data block is recreated and stored in the system cache in its original form so that it can be returned to the host. If the requested read data was previously compressed, the block is first decompressed prior to sending the read data block to the host. If the compressed read data block is already stored in the system cache, the data is uncompressed to a temporary or buffer location, the uncompressed data is sent to the host, and the buffer or temporary location is released. If the compressed read data block is not in system cache but stored on physical storage 110a, 110b, the compressed read data block may be read from physical storage 110a, 110b into system cache, uncompressed to a buffer or temporary location, and then returned to the host. Thus, requested read data stored on physical storage 110a, 110b may be stored in a deduplicated or compressed form as noted above where processing is performed by 105a to restore or convert the deduplicated or compressed form of the data to its original data form prior to returning the requested read data to the host.

In connection with techniques herein, each processor or CPU may include its own private dedicated CPU cache (also sometimes referred to as processor cache) that is not shared with other processors. In at least one embodiment, the CPU cache, as in general with cache memory, may be a form of fast memory (relatively faster than main memory which may be a form of RAM). In at least one embodiment, the CPU or processor cache is on the same die or chip as the processor and typically, like cache memory in general, is far more expensive to produce than normal RAM such as may be used as main memory. Processor cache is substantially faster than the system RAM such as used as main memory and contains information that the processor will be immediately and repeatedly accessing. The faster memory of the CPU cache may, for example, run at a refresh rate that's closer to the CPU's clock speed, which minimizes wasted cycles. In at least one embodiment, there may be two or more levels (e.g., L1, L2 and L3) of cache. The CPU or processor cache may include at least an L1 level cache that is the local or private CPU cache dedicated for use only by that particular processor. The two or more levels of cache in a system may also include at least one other level of cache (LLC or lower level cache) that is shared among the different CPUs. The L1 level cache serving as the dedicated CPU cache of a processor may be the closest of all cache levels (e.g., L1-L3) to the processor which stores copies of the data from frequently used main memory locations. Thus, the system cache as described herein may include the CPU cache (e.g., the L1 level cache or dedicated private CPU/processor cache) as well as other cache levels (e.g., the LLC) as described herein. Portions of the LLC may be used, for example, to initially cache write data which is then flushed to the backend physical storage.

When the processor performs processing, such as in connection with inline processing 105a, 105b as noted above, data may be loaded from main memory and/or other lower cache levels into its CPU cache. In particular, inline compression (ILC) and inline data deduplication (ILD) may be performed as part of inline processing 105a, 105b. In an embodiment in accordance with techniques herein, ILC and ILD may be synchronized to both concurrently perform processing on the same chunk (e.g., block or portion) of data to prevent loading the data chunk being processed into the CPU's cache more than once. In at least one embodiment, the size of a data chunk processed by ILC and ILD may be 256 bytes.

Figure 3:
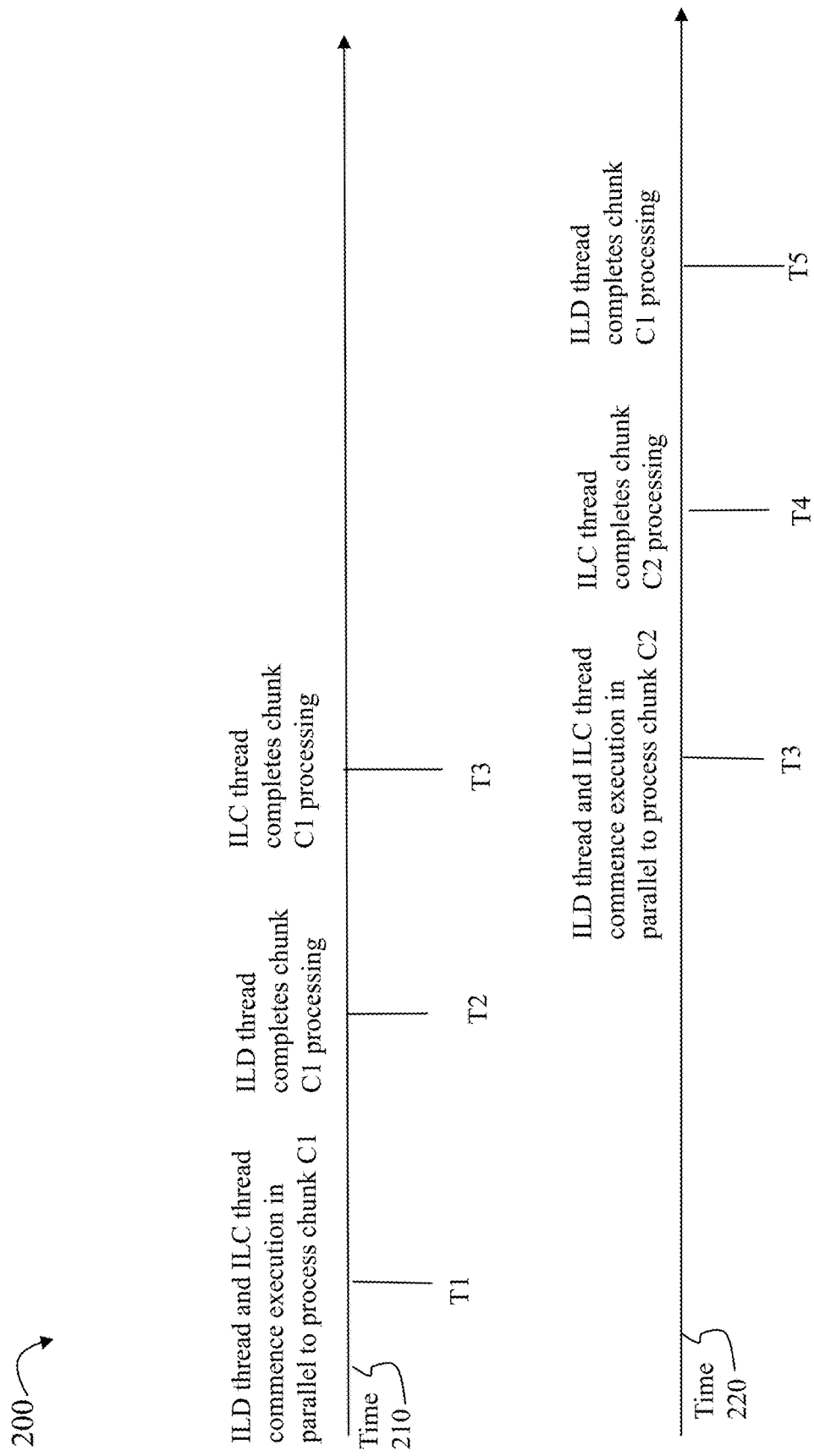
FIGS. 3, 4, 5, and 6 illustrate processing time lines illustrating execution of processing that may be performed in embodiment in accordance with techniques herein.

In a first embodiment in accordance with techniques herein, different threads performing concurrent processing may be synchronized and execute in parallel, such as on multiple cores of the same CPU having its own dedicated CPU cache. In such an embodiment, the different threads or processes may concurrently and in parallel perform processing for the same data chunk stored in the CPU cache. In particular, a first thread or process may perform ILC processing and a second thread or process may perform ILD processing. Execution of the first thread or process and the second thread or process may be performed in parallel and synchronized to both operate on the same data chunk concurrently. Execution of both threads operating on a current data chunk may be synchronized so that neither of the two threads proceeds to perform processing for another next chunk until both threads have completed processing for the same current chunk. For example with reference to FIG. 3, shown is execution processing time line 210 denoting processing performed by ILC and ILD threads for data chunk C1, and execution processing time line 220 denoting processing performed by ILC and ILD threads for data chunk C2. As illustrated by 210, assume the ILD thread and the ILC thread commence processing in parallel at time T1 operating on the same data chunk C1. In particular, at least data compression processing of the ILC thread and at least digest computation processing of the ILD thread are performed in parallel for a current data chunk C1. Assume at time T2, that the ILD thread completes processing for C1 but that the ILC thread has not yet completed its processing for C1. The ILC then completes its processing at a later time T3 for chunk C1. In this case, synchronization is performed so that the ILD thread waits (does not advance to processing another chunk) until the ILC thread completes its processing for chunk C1 at time T3. Responsive to both the ILD thread and the ILC thread having completed processing for the same chunk C1 at time T3, both the ILD thread and the ILC thread may again commence synchronized processing of the same next chunk C2. In this example for chunk C1, the synchronization processing causes the ILD thread to wait an amount of time denoted by T3-T2. More generally, the parallel synchronized execution of the ILD and ILC threads proceeds with processing of each chunk at the speed of the slower of the two threads. At time T3, both the ILD thread and the ILC thread have completed processing of chunk C1 and both commence with synchronized parallel execution of processing of the next chunk C2 as illustrated by 220. At time T4, assume the ILC thread completes processing for chunk C2 but the ILD thread has not yet completed its processing for chunk C2. In this case, synchronization is performed so that the ILC thread waits (does not advance to processing another chunk) until the ILD thread completes its processing for chunk C2 at time T5. Responsive to both the ILD thread and the ILC thread having completed processing for the same chunk C2 at time T5, both the ILD thread and the ILC thread may again commence synchronized processing of the same next chunk. If any. In this example with chunk C2, the synchronization processing causes the ILC thread to wait an amount of time denoted by T5-T4. Thus, although ILD and ILC are independent algorithms that may concurrently operate on the same data chunk, synchronization of the parallel ILD and ILC threads may be used to avoid having to fetch the same chunk of data from main memory for processing more than once. Having multiple threads for ILD and ILC processing allows executing both the ILD and ILC processing of the same data chunk to be performed in parallel whereby neither thread advances to process another data chunk until the slower of the two threads also completes. In this manner, where both the ILD and ILC threads execute on a CPU and perform processing for the same data chunk, the data chunk is fetched from main memory once and the stored in the CPU cache where it is accessible and used during parallel execution of both the ILD and ILC threads.

Figure 4:
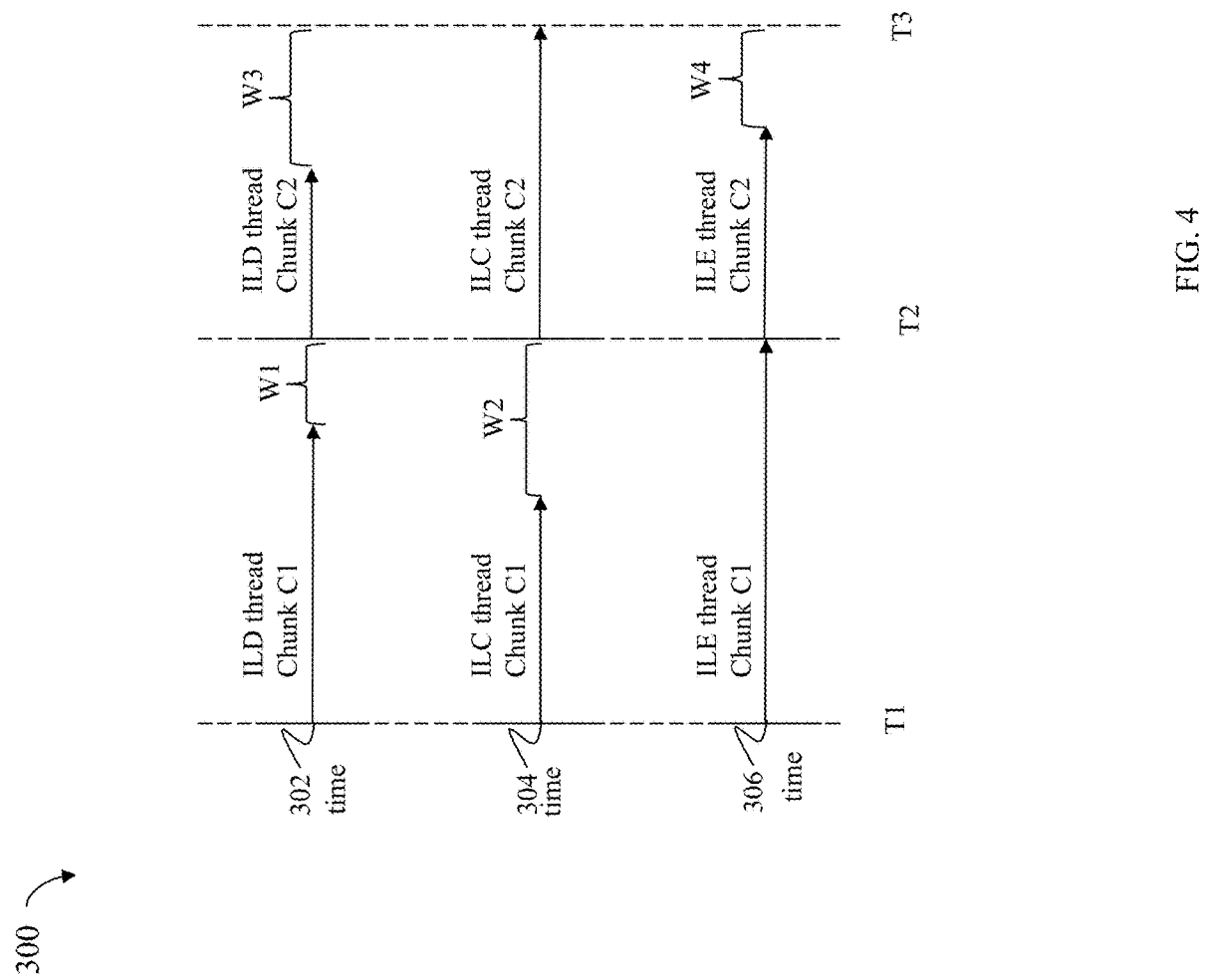

It should be noted that the foregoing as illustrated in FIG. 3 involves two threads or two independent computation streams that may be further extended to more than two processes or threads that can run concurrently. Additionally, the foregoing is not limited to just the particular processing operations of ILD and ILC and may generally be applied to any number and type of processing operations that can run concurrently. For example, with reference to FIG. 4, shown is an example 300 illustrating use of techniques herein with three processes that can run concurrently, and in parallel, as 3 separate threads—ILD, ILC and inline encryption (ILE)—and respective associated execution time lines 302, 304 and 306. In the example 300, in addition to running ILD and ILC threads in parallel, an additional third thread performing ILE also executes in parallel with the ILD and ILC threads. In this example, processing of all 3 threads ILD, ILC and ILE may be synchronized in a manner similar to that as described above in connection with FIG. 3 with 2 threads ILD, ILC. In the example 300, the ILC, ILD and ILE threads may commence parallel execution at a same point in time T1 and may also perform processing on the same data chunk C1. Further, as illustrated in the example 300, assume that both the ILC thread and the ILD thread operating on data chunk C1 completes processing while the ILE thread has not yet completed processing on data chunk C1. Consistent with discussion above regarding FIG. 3, both the ILD and ILC threads wait until thread ILE has completed processing for data chunk C1 before any of the ILD, ILC and ILE threads proceed to perform processing on any other data chunk. In this example, the ILE thread finishes data chunk C1 processing at time T2 where all 3 threads then commence performing parallel execution processing of the next chunk C2. Elements W1, W2 respectively denote the amount of time that the ILD, ILC threads wait for the last remaining thread ILE to complete processing on chunk C1 before all 3 threads commence performing parallel execution processing of the next chunk C2.

In the example 300 in connection with processing data chunk C2, assume that both the ILD thread and the ILE thread operating on data chunk C2 completes processing while the ILC thread has not yet completed processing on data chunk C2. Consistent with discussion above, both the ILD and ILE threads wait until thread ILC has completed processing for data chunk C2 before any of the ILD, ILC and ILE threads proceed to perform processing on any other data chunk. In this example, the ILC thread finishes data chunk C2 processing at time T3 where all 3 threads may then commence performing parallel execution processing of a next same chunk. Elements W3, W4 respectively denote the amount of time that the ILD, ILE threads wait for the last remaining thread ILC to complete processing on chunk C2 before all 3 threads are allowed to commence performing processing of a next same data chunk.

In connection with synchronizing processing of the threads or processing, such as described above in connection with FIGS. 3 and 4 as well as other examples herein, any suitable technique known in the art and any suitable available synchronization primitives or operations in an embodiment may be utilized to ensure that none of the threads executing in parallel performing processing of the same current data chunk are allowed to advance to perform processing for a different data chunk until all of the synchronized threads complete processing of the same current data chunk.

In another embodiment in accordance with techniques herein, rather than execute the concurrent processing performed for ILC, ILD and ILE in parallel for the same data chunk, processing may be performed sequentially per data chunk by sequentially performing processing of the ILC, ILD and ILE operations for the same data chunk before any of the foregoing ILC, ILD and ILE processing proceeds with a different next data chunk.

Figure 5:
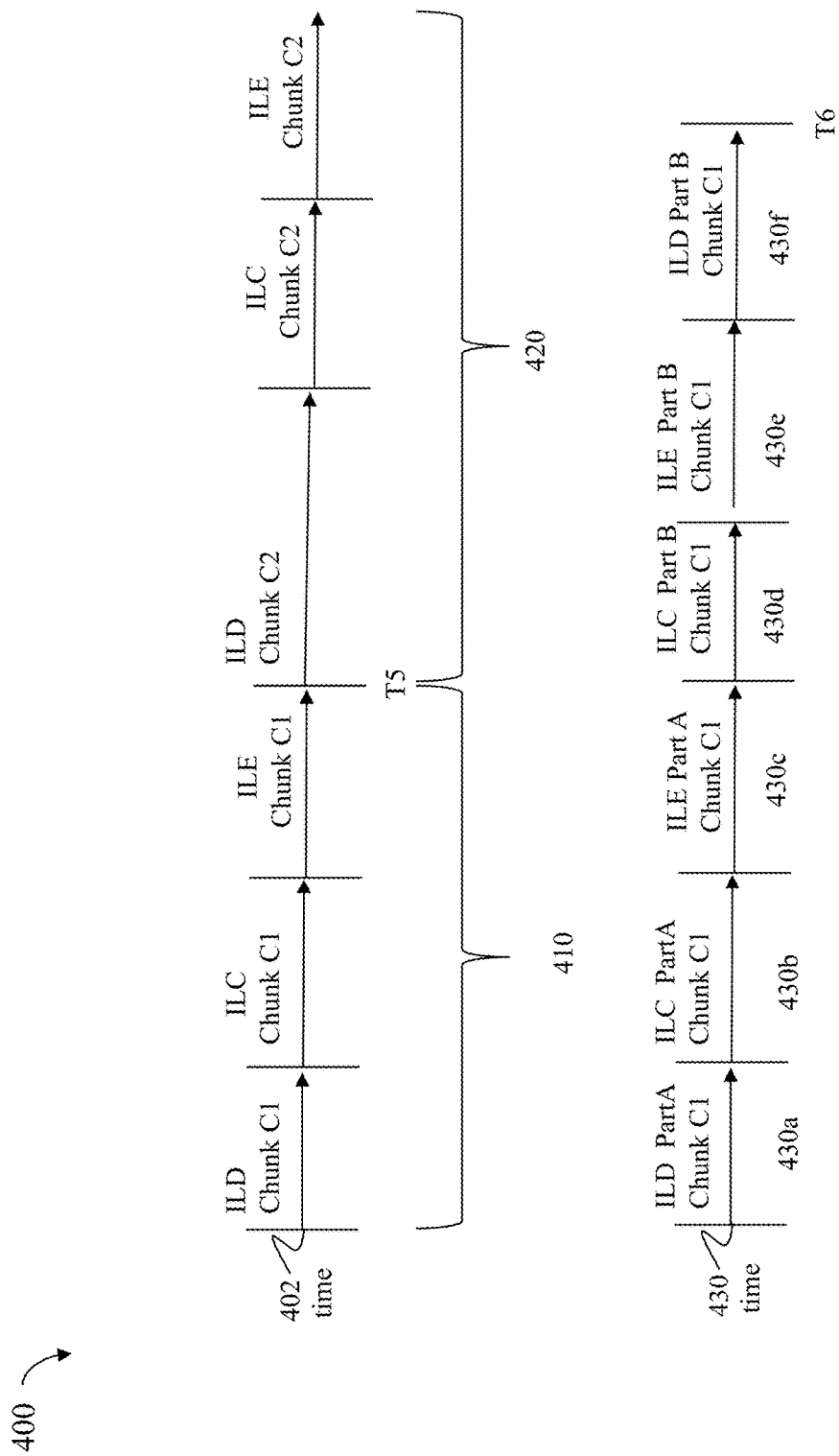

Referring to FIG. 5, shown is an example 400 illustrating another embodiment in accordance with techniques herein. In the example 400, time line 402 illustrates synchronized sequential execution of chunk processing for data chunk C1 followed by data chunk C2. Element 410 denotes the amount of time for sequential processing performed for ILD, ILC and ILE for data chunk C1; and element 420 denotes the amount of time for sequential processing performed for ILD, ILC and ILE for data chunk C2. Processing proceeds sequentially for data chunk C1 in the following order: ILD, ILC and ILE. Once processing of data chunk C1 completes at time T5, processing proceeds sequentially for data chunk C2 in the following order: ILD, ILC and ILE. In this manner, ILD, ILC and ILE processing for the same chunk C1 must complete prior to any of the ILD, ILC and ILE processing proceeding with the next data chunk C2. In this example 400, the ILD, ILC and ILE processing may proceed in a sequential manner for each data chunk in a synchronized manner where code performing such processing for ILD, ILC and ILE does not proceed with a next data chunk until all such code for ILD, ILC, and ILE have completed processing for the same current chunk. In at least one embodiment, the processing performed for ILD, ILC and ILE may be performed sequentially within the context of a single thread executing on a CPU or processor. With reference to 410, the data chunk C1 may be initially loaded into the processor's CPU cache where the chunk C1 may then be used in connection performing ILD, ILC and ILE processing as denoted by 410. Since such processing is performed sequentially for the same chunk C1, once C1 is initially loaded into the CPU cache, there is no need to again fetch and reload the CPU cache with C1. In connection with performing the sequential ILD, ILC, ILE processing for C1, there is none or minimal chance that C1 would be evicted from the CPU cache during the sequential processing time 410. In this manner, the sequential ILD, ILC, ILE processing for C1 facilitates improved processing time, such as improved I/O response time, since C1 does not need to be repeatedly fetched and loaded into the CPU cache when performing ILC and/or ILE processing. Similarly with reference to 420, after C2 is initially loaded into the CPU cache in connection with ILD processing, there is none or minimal chance that C2 would be evicted from the CPU cache. In this manner, the sequential ILD, ILC, ILE processing for C2 facilitates improved processing time, such as improved I/O response time, since C2 does not need to be repeatedly fetched and loaded into the CPU cache when performing ILC and/or ILE processing.

It should be noted that the embodiment of techniques herein as described in connection with 402 of FIG. 5 where such processing is performed within a single thread (e.g., or more generally a single code execution unit) may not require inter-thread communication or synchronization between threads thereby having generally less overhead and associated synchronization processing time as compared to the parallel execution embodiments as described in connection with FIGS. 3 and 4. However, omitting the parallel execution in the embodiment of FIG. 5 (in comparison to the parallel execution embodiments of FIGS. 3 and 4) is a factor that further increases the amount of execution time associated with a data chunk.

The particular ordering of the ILD, ILC and ILE processing performed sequentially for each data chunk may vary from that as described in connection with 402 of FIG. 5 depending on the particular implementation and is not strictly limited to the defined sequential ordering as in the example 400. Furthermore, although the example 400 illustrates sequentially performing all of ILD processing prior to ILC processing, and performing all of ILC processing prior to ILE processing for the same data chunk, an embodiment may interleave processing of different code segments of each of ILC, ILD and/or ILE processing. For example, reference is made to processing time line 430 for data chunk C1 processing. In this example, assume that ILD, ILE and ILC processing have each been partitioned into two parts—Part A and Part B. Element 430 denotes that processing for data chunk C1 is performed in sequential order as follows: ILD Part A 430a, ILC Part A 430b ILE Part A 430c, ILC Part B 430d, ILE Part B 430e, and ILD Part B 430f. More generally, processing for each of ILE, ILD, and ILC may be partitioned into any number of processing segments or parts whereby the sequential ordering of such segments or parts for each single data chunk may be performed in any suitable sequential order (prior to proceeding with processing for a next data chunk by any such processing segments or parts).

Figure 6:
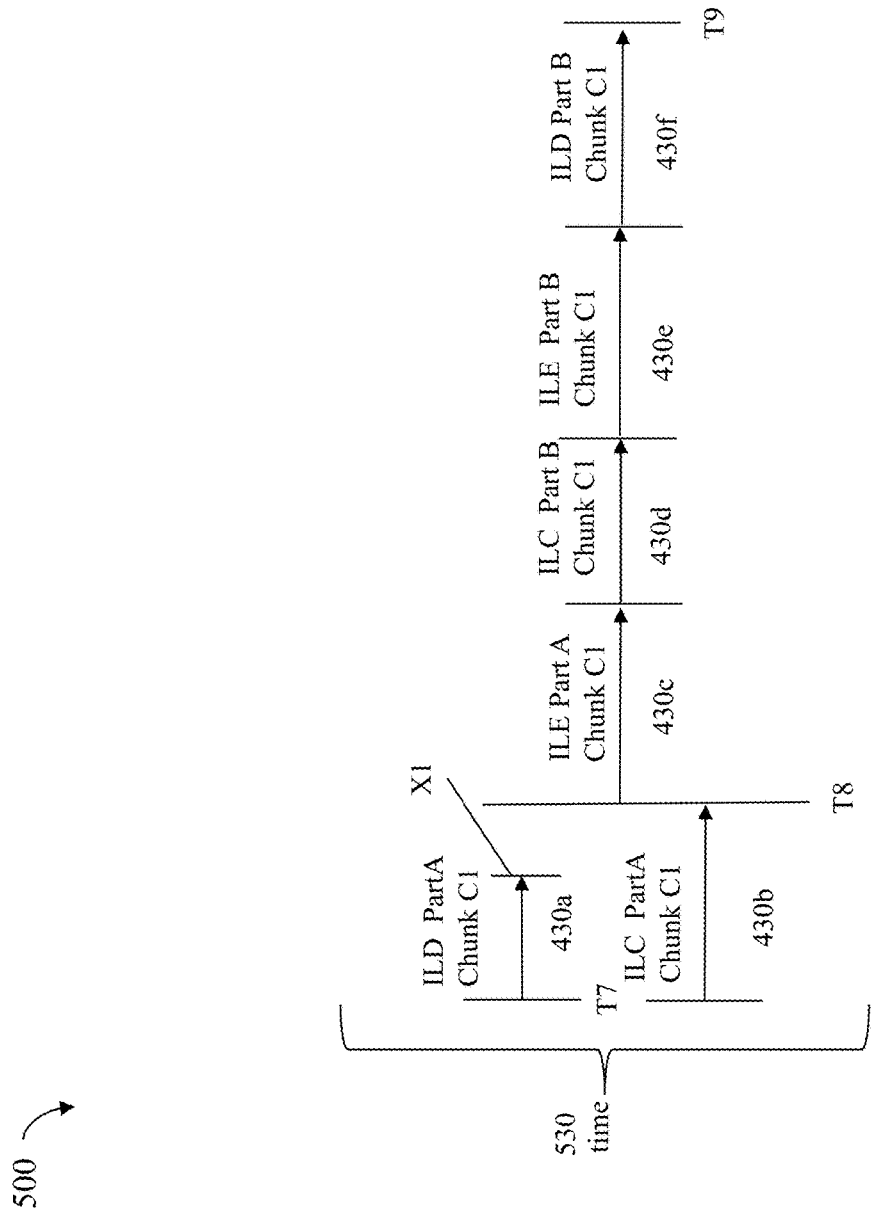

As a further variation, with reference now to the example 500 of FIG. 6, an embodiment in accordance with techniques herein may perform a combination of synchronized parallel and sequential ILC, ILD and ILE processing for a single data chunk prior to proceeding with processing of a next data chunk. The particular processing segments or parts which are performed sequentially or in parallel may vary with embodiment as well as the particular processing operations and algorithms utilized. For example, as illustrated in time line 530, an embodiment may perform only ILD Part A 430a and ILC Part A 430b in parallel for a data chunk C1 with remaining parts 410c-f performed sequentially. In such an embodiment, independent of which processing parts or segments are performed sequentially or in parallel, any code of ILE, ILD and ILC processing may not proceed with subsequent processing of next data chunk C2 until all such code for ILE, ILD and ILC processing has completed for chunk C1 at time T6. Element 530 denotes an execution time line for processing data chunk C1. ILC, ILD and ILE processing may be partitioned into parts or segments such as described in connection with 430 of FIG. 5. ILD part A 430a (e.g., portion of ILD processing such as digest computation) and ILC part A 430b (e.g., portion of compression processing) may commence processing in parallel at time T7 where ILD part A 430a finishes at time X1 while ILC part A 430b is still executing. Thus, consistent with other discussion herein (e.g., FIGS. 3 and 4), ILD Part A 430a may wait until ILC part A 430b completes processing at time T8. Once both 430a and 430b have completed for chunk C1 at time T8, processing may subsequently continue with sequentially performing the remaining processing of 430c-f for the data chunk C1 prior to proceeding with processing for a next data chunk, such as C2.

In this manner, an embodiment in accordance with techniques herein may perform concurrent processing on a same data chunk in a synchronized manner where processing (e.g., such as for multiple inline processing operations) of each single data chunk completes prior to commencing processing for a next data chunk. In this manner, techniques herein avoid loading a data chunk into cache, such as the CPU cache, more than once thereby improving system efficiency and performance.

Techniques described herein provide for an improvement over other approaches that may not perform data chunk synchronization whereby the same data chunk may be refetched and reloaded into the CPU cache multiple times. Described herein are various embodiments which perform data chunk synchronization of two or more data processing operations, such as any two or more of ILC, ILD and ILE. More generally, techniques herein may be extended for use with any number of data processing operations operating on the same data chunk and may be extended to apply for any other data processing operations that can may be performed concurrently.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of performing data processing comprising:
issuing, from an application on a host to a data storage array, a write I/O operation that writes a first data chunk to a first logical address;
receiving, at a first processor of the data storage array, the write I/O operation; and
responsive to receiving the write I/O operation, performing I/O path processing by the first processor to service the write I/O operation, said I/O path processing including:
caching the first data chunk in a cache of the first processor;
responsive to said caching, the first processor returning an acknowledgement to the host regarding completion of the write I/O operation;
subsequent to said caching, the first processor flushing the first data chunk from the cache to a storage location on a non-volatile storage device providing backend storage for the first logical address, said flushing including:
the first processor performing inline processing of the first data chunk, wherein said inline processing generates a reduced form of the first data chunk, wherein said inline processing includes:
performing first processing for a first data processing operation on the first data chunk;
performing second processing for a second data processing operation on the first data chunk, wherein the first data processing operation is data deduplication and the first processing includes digest computation, and wherein the second data processing operation is data compression and the second processing includes data compression processing; and
synchronizing the first processing and the second processing with respect to the first data chunk, wherein said synchronizing ensures that both the first processing of the first data chunk and the second processing of the first data chunk have completed prior to proceeding with performing any of the first processing on a second data chunk and the second processing on the second data chunk, wherein the first data chunk and the second data chunk are different data chunks, wherein the first data processing operation on the first data chunk performs data deduplication processing on the first data chunk and wherein the first processing on the first data chunk includes digest computation processing for the first data chunk that generates a first digest for the first data chunk, wherein the second processing of the first data chunk includes data compression processing of the first data chunk, and wherein said synchronizing the first processing of the first data chunk and the second processing for the first data chunk includes performing the first processing of the first data chunk and the second processing of the first data chunk in parallel so that at least digest computation processing for the first data chunk is performed in parallel with data compression processing for the first data chunk, and wherein said synchronizing includes commencing, at a same point in time, execution of the first processing of the first data chunk that generates a first digest for the first data chunk and execution of the second processing of the first data chunk that performs data compression processing for the first data chunk, wherein the first processing of the first data chunk is performed by a first thread executing on a first core of the first processor, and wherein the second processing of the first data chunk is performed by a second thread executing on a second core of the first processor, and wherein the first thread and the second thread execute in parallel when processing the first data chunk that is stored in a processor local cache of the cache of the first processor, wherein the processor local cache of the first processor is a private dedicated cache used only by the first processor and is not shared with other processors in a multi-processor system; and the first processor writing the reduced form of the first data chunk to the storage location.

2. The method of claim 1, wherein one of the first processing of the first data chunk and the second processing of the first data chunk completes processing prior to another one of the first processing of the first data chunk and the second processing of the first data chunk, and wherein said synchronizing does not allow any of the first processing and the second processing to proceed with processing the second data chunk until both the first processing of the first data chunk and the second processing of the first data chunk have completed.

3. The method of claim 2, wherein said flushing performed by the first processor further includes the first processor performing third processing for a third data processing operation of the first data chunk, wherein the third processing of the first data chunk is performed in parallel with the first processing of the first data chunk and the second processing of the first data chunk.

4. The method of claim 3, wherein the third data processing operation includes any of encryption and decryption.

5. The method of claim 1, wherein performing one of the first data processing operation of the first data chunk and the second data processing operation of the first data chunk results in loading the first data chunk in the processor local cache of the first processor, and wherein the first data chunk remains in the processor local cache of the first processor while at least performing the first data processing operation for the first data chunk and the second data processing for the first data chunk.

6. A data storage array comprising:

at least one processor; and a memory comprising code stored therein that, when executed, performs a method of data processing comprising:

issuing, from an application on a host to the data storage array, a write I/O operation that writes a first data chunk to a first logical address;

receiving, at a first processor of the data storage array, the write I/O operation; and responsive to receiving the write I/O operation, performing I/O path processing by the first processor to service the write I/O operation, said I/O path processing including:

caching the first data chunk in a cache of the first processor;

responsive to said caching, the first processor returning an acknowledgement to the host regarding completion of the write I/O operation;

subsequent to said caching, the first processor flushing the first data chunk from the cache to a storage location on a non-volatile storage device providing backend storage for the first logical address, said flushing including:

the first processor performing inline processing of the first data chunk, wherein said inline processing generates a reduced form of the first data chunk, wherein said inline processing includes:

performing first processing for a first data processing operation on the first data chunk;

performing second processing for a second data processing operation on the first data chunk, wherein the first data processing operation is data deduplication and the first processing includes digest computation, and wherein the second data processing operation is data compression and the second processing includes data compression processing; and synchronizing the first processing and the second processing with respect to the first data chunk, wherein said synchronizing ensures that both the first processing of the first data chunk and the second processing of the first data chunk have completed prior to proceeding with performing any of the first processing on a second data chunk and the second processing on the second data chunk, wherein the first data chunk and the second data chunk are different data chunks, wherein the first data processing operation on the first data chunk performs data deduplication processing on the first data chunk and wherein the first processing on the first data chunk includes digest computation processing for the first data chunk that generates a first digest for the first data chunk, wherein the second processing of the first data chunk includes data compression processing of the first data chunk, and wherein said synchronizing the first processing of the first data chunk and the second processing for the first data chunk includes performing the first processing of the first data chunk and the second processing of the first data chunk in parallel so that at least digest computation processing for the first data chunk is performed in parallel with data compression processing for the first data chunk, and wherein said synchronizing includes commencing, at a same point in time, execution of the first processing of the first data chunk that generates a first digest for the first data chunk and execution of the second processing of the first data chunk that performs data compression processing for the first data chunk, wherein the first processing of the first data chunk is performed by a first thread executing on a first core of the first processor, and wherein the second processing of the first data chunk is performed by a second thread executing on a second core of the first processor, and wherein the first thread and the second thread execute in parallel when processing the first data chunk that is stored in a processor local cache of the cache of the first processor, wherein the processor local cache of the first processor is a private dedicated cache used only by the first processor and is not shared with other processors in a multi-processor system; and the first processor writing the reduced form of the first data chunk to the storage location.

7. A non-transitory computer readable medium comprising code stored thereon that, when executed, performs a method of data processing comprising:

issuing, from an application on a host to a data storage array, a write I/O operation that writes a first data chunk to a first logical address;

receiving, at a first processor of the data storage array, the write I/O operation; and responsive to receiving the write I/O operation, performing I/O path processing by the first processor to service the write I/O operation, said I/O path processing including:

caching the first data chunk in a cache of the first processor;

responsive to said caching, the first processor returning an acknowledgement to the host regarding completion of the write I/O operation;

subsequent to said caching, the first processor flushing the first data chunk from the cache to a storage location on a non-volatile storage device providing backend storage for the first logical address, said flushing including:

the first processor performing inline processing of the first data chunk, wherein said inline processing generates a reduced form of the first data chunk, wherein said inline processing includes:

performing first processing for a first data processing operation on the first data chunk;

performing second processing for a second data processing operation on the first data chunk, wherein the first data processing operation is data deduplication and the first processing includes digest computation, and wherein the second data processing operation is data compression and the second processing includes data compression processing; and synchronizing the first processing and the second processing with respect to the first data chunk, wherein said synchronizing ensures that both the first processing of the first data chunk and the second processing of the first data chunk have completed prior to proceeding with performing any of the first processing on a second data chunk and the second processing on the second data chunk, wherein the first data chunk and the second data chunk are different data chunks, wherein the first data processing operation on the first data chunk performs data deduplication processing on the first data chunk and wherein the first processing on the first data chunk includes digest computation processing for the first data chunk that generates a first digest for the first data chunk, wherein the second processing of the first data chunk includes data compression processing of the first data chunk, and wherein said synchronizing the first processing of the first data chunk and the second processing for the first data chunk includes performing the first processing of the first data chunk and the second processing of the first data chunk in parallel so that at least digest computation processing for the first data chunk is performed in parallel with data compression processing for the first data chunk, and wherein said synchronizing includes commencing, at a same point in time, execution of the first processing of the first data chunk that generates a first digest for the first data chunk and execution of the second processing of the first data chunk that performs data compression processing for the first data chunk, wherein the first processing of the first data chunk is performed by a first thread executing on a first core of the first processor, and wherein the second processing of the first data chunk is performed by a second thread executing on a second core of the first processor, and wherein the first thread and the second thread execute in parallel when processing the first data chunk that is stored in a processor local cache of the cache of the first processor, wherein the processor local cache of the first processor is a private dedicated cache used only by the first processor and is not shared with other processors in a multi-processor system; and the first processor writing the reduced form of the first data chunk to the storage location.

8. The non-transitory computer readable medium of claim 7, wherein one of the first processing of the first data chunk and the second processing of the first data chunk completes processing prior to another one of the first processing of the first data chunk and the second processing of the first data chunk, and wherein said synchronizing does not allow any of the first processing and the second processing to proceed with processing the second data chunk until both the first processing of the first data chunk and the second processing of the first data chunk have completed.

9. The non-transitory computer readable medium of claim 7, wherein performing one of the first data processing operation of the first data chunk and the second data processing operation of the first data chunk results in loading the first data chunk in the processor local cache of the first processor which includes the first core that executes code of the first thread to perform the first processing of the first data chunk and which includes the second core that executed code of the second thread to perform the second processing of the first data chunk, and wherein the first data chunk remains in the processor local cache of the first processor while at least performing the first data processing operation of the first data chunk and the second data processing operation of the first data chunk.

10. The method of claim 1, wherein the first processing of the first data chunk performed by the first thread and the second processing of the first data chunk performed by the second thread are synchronized by said synchronizing so that the neither the first thread nor the second thread is allowed to proceed with processing the second data chunk until both the first processing of the first data chunk performed by the first thread and the second processing of the first data chunk performed by the second thread have completed.

* * * * *